March 26, 1957 E. C. POLLARD 2,786,995
MEDIUM PRECISION SELF-SYNCHRONOUS
AUTOMATIC RANGE TRACKING CIRCUIT
Filed Dec. 28, 1945

INVENTOR
ERNEST C. POLLARD

BY M. O. Hayes

ATTORNEY

United States Patent Office 2,786,995

Patented Mar. 26, 1957

2,786,995

MEDIUM PRECISION SELF-SYNCHRONOUS AUTOMATIC RANGE TRACKING CIRCUIT

Ernest C. Pollard, Belmont, Mass., assignor, by mesne assignments, to the United States of America as represented by the Secretary of the Navy Application December 28, 1945, Serial No. 637,747

9 Claims. (Cl. 343—7.3)

This invention relates in general to gate generating apparatus, and more particularly to such apparatus used in automatic range tracking systems.

A convenient method of accomplishing range tracking employs a receiver with a gated channel which is energized by a short gate. This gate can be positioned at any time delay from the transmitted pulse by some suitable manually operated means. When the gate is so positioned that its time or point of occurrence coincides with that of the desired target, the target range is obtained from the gate positioning means.

It is an object of this invention to provide means for automatically positioning the gate so that it continuously coincides in time or point of occurence with the tracked target signal.

A further object of this invention is to provide apparatus for generating a gate which can be periodically changed in time or point of ocurrence and can be so controlled that the average time or mean point of occurrence can be varied.

Other objects and advantages of this invention will be apparent from the following description, accompanied by a drawing in which.

Figure 1:
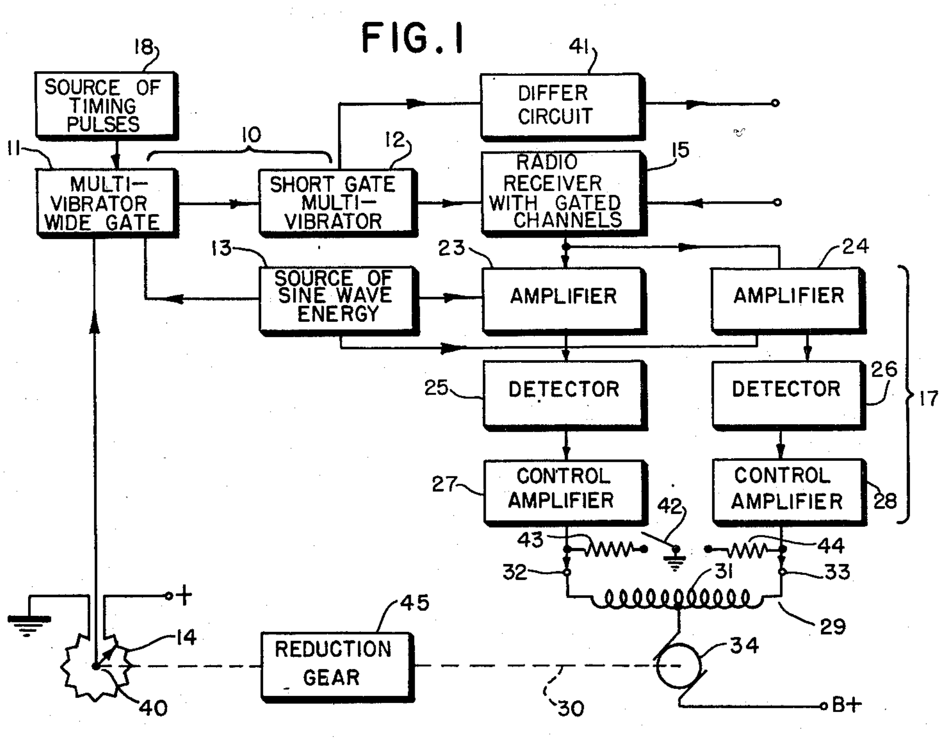
Fig. 1 is a block diagram of an embodiment of this invention.

The embodiment shown in Fig. 1 includes a gate generating apparatus generally designated 10. This generator comprises means 11 and 12 for producing an approximately rectangular gate of short duration, means 13 for periodically changing the time or point of occurrence of the gate, and means 14 for controlling the average time or mean point of occurrence of the gate.

Also included in this embodiment of the invention is a gated radio apparatus including in addition to the previously mentioned means, a radio receiver 15 which has one or more gated channels. When the short gate energizes the receiver for its duration, there is available from the receiver 15 an output controlled in time or point of occurrence by means 13 and means 14. Only those signals applied to the receiver coincident with the gate will be passed.

The aforementioned means in combination with means generally designated 17 comprise an automatic signal tracking apparatus. Means 17 cooperates with means 13 and the output of receiver 15, to automatically so actuate control means 14, that the average time or mean point of occurrence of the gate follows the time or point of occurrence of a signal applied to receiver 15. This is done in one case by using means 13 to alternately actuate two channels receiving the signal, the outputs of which channels are equal if the average time or mean position of the gate is correct, and are unequal (in one sense or the other) if the mean gate position is incorrect. This inequality is then used to correct the mean gate position.

Figure 2:
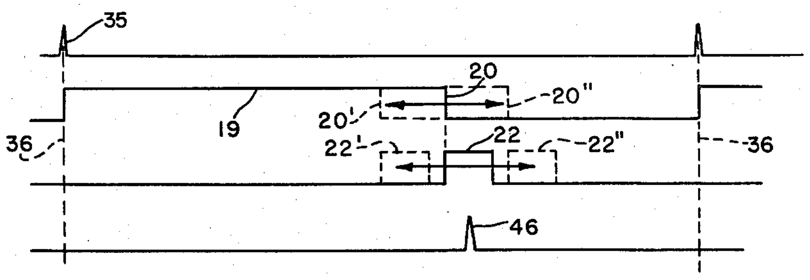
Fig. 2 shows representative voltage waveforms in the gate generator of Fig. 1.

Means 11 and 12 for producing a short duration rectangular gate comprise a pair of conventional multivibrators. The first multivibrator 11, driven from a source of timing pulses 18, produces a wide gate (see 19, Fig. 2). The trailing edge (see 20 in Fig. 2) triggers a second multivibrator 12 (Fig. 1). This multivibrator generates an approximately rectangular narrow gate (see 22 in Fig. 2) which is timed or positioned by the trailing edge of the output wave of wide gate multivibrator 11 (Fig. 1). The trailing edge of the first gate (see 20 in Fig. 2) is periodically changed (see 20′ and 20″) in time or point of occurrence by means 13 (Fig. 1). Means 13 consists of a source of periodic voltage, in this case, a source of sine wave energy. When this voltage is applied to wide gate multivibrator 11, the trailing edge of its output wave form alternately occurs sooner or later, that is, the trailing edge is wobbled slightly, and therefore the narrow gate (see 22′ and 22″ in Fig. 2) is correspondingly wobbled in time or point of occurrence.

Means 14 (Fig. 1) for controlling the average time or mean point of occurrence of gate 22 (Fig. 2) consists of a potentiometer 14, one side of which is connected to ground and the other side of which is connected to a source of positive voltage. The center contact of potentiometer 14 supplies a voltage to multivibrator 11 which controls the average time or mean point of occurrence of the narrow gate.

Means 17 comprises a servomechanism including a plurality of amplifiers 23 and 24 cooperating with periodically changing means 13 and receiver 15, for amplifying the signal output of the receiver. It further comprises a plurality of detectors 25 and 26 coupled to amplifiers 23 and 24, a plurality of control amplifiers 27 and 28 driven by the output of detectors 25 and 26 respectively, and an electric motor 29 actuated by the control amplifiers and operating control means 14. Motor 29 mechanically operates potentiometer 14 as indicated by dotted line 30 and reduction gear 45. The field winding 31 of motor 29 has its ends 32 and 33 coupled to the output of control amplifiers 27 and 28 respectively, and its center tap connected to the armature 34. The other side of armature 34 is connected to a positive D. C. voltage. This supplies power for motor 29, and for amplifiers 27 and 28.

Amplifiers 23 and 24 employ multigrid tubes. Source 13 supplies a first sine wave voltage to one grid of amplifier 23, and a second sine wave 180° out of phase with the first, to a grid of amplifier 24 (see 37 and 38 in Fig. 3). Supplied to another grid of amplifiers 23 and 24 is the output of gated receiver 15. When coincidence occurs in either amplifiers 23 or 24, the signal from receiver 15 (see 39, Fig. 3) will be passed.

Supplied to multivibrator 11 is a series of timing pulses (see 35, Fig. 2) separated by the full range sweep of the associated radar system. Each pulse occurs at reference time zero (see 36 in Fig. 2) and triggers multivibrator 11 (Fig. 1) which in turn generates a wide gate as shown by 19 in Fig. 2. The trailing edge of this gate is wobbled slightly in range as shown at 20′, 20″, and the average time or point of occurrence of this trailing edge is also controlled. The trailing edge of this gate triggers multivibrator 12 (Fig. 1) which in turn generates a short duration gate (see 22′, 22, 22″ in Fig. 2) wobbled in range and controlled in point of occurrence. Wobbling of this gate is accomplished by introducing a sine wave voltage into the circuit controlling the range delay of the gate so that the gate is moved back and forth periodically. The position of the gate, relative to its mean position, can be obtained from the value of the sine wave voltage. If an increased positive voltage on a grid of multivibrator 11 causes less delay of narrow gate 22 (Fig. 2), then the positive part of the sine wave voltage corresponds to less range delay, and the negative portion of this voltage corresponds to more range delay. In this manner the position or time of occurrence of the narrow gate is varied or wobbled.

The sine wave voltage from source 13 alternately activates amplifiers 23 and 24 so that one amplifier passes grid signals when the periodic voltage is positive at that amplifier, and therefore the signal passed by this amplifier is the signal which is going through the receiver when the narrow gate is early. If the average position of the gate is too early in range, there will be a preponderance of signal in the late phase, as shown by curve 39 in Fig. 3. This curve represents the output of either amplifier 23 or 24 (Fig. 1) depending on which amplifier is driven by the voltage as represented by curve 38. This output is coupled to one of the detectors 25 or 26 (Fig. 1) which in turn drives one of the control amplifiers 27 or 28. Assume that amplifier 23 is driven by the voltage represented by curve 38 (Fig. 3), then control amplifier 27 conducts, causing motor 29 to turn. Since armature 34 is mechanically geared to the arm 40 of potentiometer 14, as indicated by dotted line 30, arm 40 is turned when motor 29 rotates. This movement of arm 40 changes the average voltage supplied to multivibrator 11 in that direction which changes the average position of the narrow gate until it coincides in time or point of occurrence with the signal (see 46 in Fig. 2).

Figure 3:
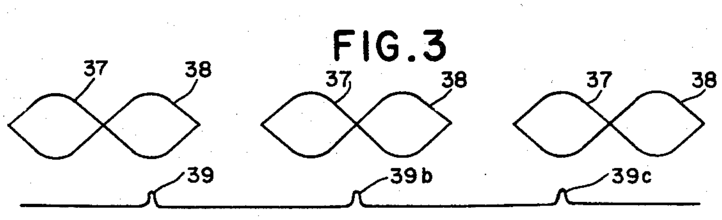
Fig. 3 shows representative voltage waveforms in the servomechanism of Fig. 1.

If the average position of the gate is late in range, there will be a preponderance of echo in the early phase, as shown by curve **39*c* in Fig. 3. In this case amplifier 28 conducts, causing motor 29 to turn in the opposite direction and arm 40 of a potentiometer 14 changes the voltage supplied to multivibrator 11** in that direction which repositions the narrow gate to the proper point.

If the gate is properly positioned both amplifiers 23 and 24 conduct, and the output of these two amplifiers will be as represented by curve **39*b* in Fig. 3. Since both amplifiers conduct, control amplifiers 27 and 28 will pass equal currents, and motor 29** will not turn.

Selection of a given target or signal is accomplished as follows: a portion of the output of short gate multivibrator 12 drives a differentiating circuit 41. The output of this circuit is applied to the indicator of the associated radar system and is visible along with the signal indication. A single pole, double throw switch 42 is connected across terminals 32 and 33 through resistors 43 and 44. Switch 42 connects either terminal 32 or terminal 33 to ground, thereby completing the circuit for motor 29. When switch 42 is in the neutral position the control amplifiers control the motor, but in the other two positions the switch controls the motor. To select the target to be tracked, switch 42 is connected to either terminal 32 or 33 and the motor rotates until the signal from differentiating circuit 41 coincides with the target indication on the associated radar indicator. The switch is then returned to the neutral position and the selected signal will be tracked automatically as previously described.

The range of the tracked target or signal can be obtained by calibrating the position of arm 40 of potentiometer 14 in terms of range, or calibrating the average control voltage applied to multivibrator 11 in terms of range.

This embodiment has been described as using a particular type of servomechanism, but it is apparent that other types of servomechanisms could be adapted for use without departing from the scope of this invention. For example, the average time or mean point of occurrence of the narrow rectangular gate could be controlled by the servomechanism described in the copending application of Britton Chance and Andrew A. Jacobsen, Serial No. 616,378, filed September 14, 1945, entitled "Electrical Circuit," now U. S. Patent No. 2,709,804, dated May 31, 1955. In that case no motor is used, and instead the amplifier outputs charge memory circuits which in turn control the mean gate position.

This invention is to be limited only by the appended claims.

What is claimed is:

1. An automatic tracking apparatus for tracking a signal which varies in time, comprising means for producing a gate of short duration, means for periodically changing the point of occurrence of said gate, means for controlling the mean point of occurrence of said gate, a radio receiver made operative by said gate, and a servomechanism including two channels receiving the signal from said receiver, said channels being alternately actuated by said periodically changing means, said control means being actuated by the outputs of said channels, when said outputs of said channels are unequal, in a direction to cause said mean point of occurrence of said gate to follow the point of occurrence of the signal applied to said receiver.

2. An automatic tracking apparatus for radio echo ranging comprising means for producing an approximately rectangular gate of short duration, means for periodically changing the time of occurrence of said gate, means for controlling the average time of occurrence of said gate, a radio receiver made operative by said gate, a plurality of amplifiers activated in alternation by said periodically changing means and receiving said receiver output for amplifying the same, a plurality of detectors coupled to said amplifiers, a plurality of control amplifiers driven by the outputs of said detectors, and an electric motor actuated by said control amplifiers and operating said controlling means in a direction to cause said average time of occurrence of said gate to follow the time of occurrence of an echo signal applied to said receiver.

3. Apparatus comprising, means for generating a series of timing pulses, means for generating a first signal, means for controlling the amplitude of said first signal, means for generating a second control signal periodically varying in amplitude, means responsive to said timing pulses, said first signal and said second signal for producing for each of said timing pulses an output pulse having a phase with respect to a corresponding timing pulse dependent upon the amplitudes of said first and second signals substantially at the time said corresponding timing pulse is being generated.

4. In a system for automatically tracking a signal which varies in phase with respect to a series of equispaced timing pulses, means for generating a first signal, means for controlling the amplitude of said first signal, means for generating a second signal periodically varying in amplitude, means responsive to said timing pulses, said first signal and said second signal for producing a series of time-spaced gate signals, there being one such gate signal for each of said timing pulses, each of said gate signals being spaced in time from a corresponding timing pulse by an amount dependent upon the instantaneous amplitudes of said first and second signals, a normally inoperative receiver adapted to be rendered operative in response to the application thereto of said gate signals for the duration of each of said gate signals, means for applying said signal being tracked to the input of said receiver, and means for applying said gates to said receiver.

5. Automatic tracking apparatus for tracking a signal which varies in phase with respect to a series of timing pulses, the time interval between successive timing pulses being constant, comprising in combination means for generating a first signal, means for generating a second signal periodically varying in amplitude, means responsive to said timing pulses, said first signal and said second signal for producing a series of time-spaced gates, there being one such gate for each of said timing pulses, each of said gates having a phase angle with respect to a corresponding timing pulse dependent upon the instantaneous amplitudes of said first and second signals, a normally inoperative receiver adapted to be rendered operative for the duration of each of said gate signals applied thereto, means for applying said signal being tracked to the input of said receiver, means for applying said gates to said receiver, and means coupled to said first signal producing means and responsive to the output of said receiver and operatively associated with said second signal producing means for controlling the amplitude of said first signal in a direction to cause the mean phase angle of said gates to follow the phase angle of said signal being tracked.

6. Automatic tracking apparatus for tracking a signal which varies in time displacement with respect to a series of spaced timing pulses, said apparatus comprising, a gated receiver adapted to be made operative for the duration of gate signals applied thereto, a controllable gate generator coupled to said receiver to periodically render said receiver operative, means generating a first signal of controllable amplitude, means generating a second signal periodically varying in amplitude between maximum and minimum amplitudes, means for applying said timing pulses and said first and second signal generating means to said gate generating means, said gate generating means generating in response to the signals applied thereto a gate signal for each of said timing pulses, the time spacing between a gate signal and a corresponding timing pulse being dependent upon the instantaneous amplitudes of said first and second signals at the instant said gate is being generated, the time spacing between said gates and said timing pulses thereby being caused to vary periodically about a mean time position in synchronism with the periodic variation in amplitude of said second signal, first and second signal channels having a controllable gain, said channels being coupled to the output of said gated receiver, means coupled to said first and second channels to control the gain thereof, said gain control means causing the gain of said two channels to be equal when said gate is at said mean time space, said gain control means causing said first channel to have a greater gain than said second channel when the time spacing between said gates and said timing pulses is less than said mean time spacing, said gain control means being further adapted to cause the gain of said second channel to be greater than the gain of said first channel when the time spacing between said gates and timing pulses is greater than said mean time spacing, means for applying said signal to be tracked to the input of said gated receiver, and means responsive to the difference in output of said first and second signal channels and coupled to said first signal generating means for controlling the amplitude of said first signal in a direction to cause said gates when at said mean time spacing to coincide in time with the time of occurrence of said signal being tracked.

7. Automatic tracking apparatus for tracking a signal which varies in time displacement with respect to a series of spaced timing pulses, said apparatus comprising, a gated receiver adapted to be made operative for the duration of gate signals applied thereto, a controllable gate generator coupled to said receiver to periodically render said receiver operative, means generating a first signal of controllable amplitude, means generating a second signal periodically varying in amplitude between maximum and minimum amplitudes, means applying said timing pulses and said first and second signal generating means to said gate generating means, said gate generating means generating in response to the signals applied thereto a gate signal for each of said timing pulses, the time spacing between a gate signal and a corresponding timing pulse being dependent upon the instantaneous amplitudes of said first and second signals at the instant said gate is being generated, the time spacing between said gates and said timing pulses thereby being caused to vary periodically about a mean time position in synchronism with the periodic variation in amplitude of said second signal, first and second signal channels having a controllable gain, said channels being coupled to the output of said gated receiver, the gain of each of said channels being a function of a control signal applied thereto, means generating third and fourth periodic control signals, means applying said third and fourth control signals to said first and second channels, respectively, to control the gain thereof, said periodic control signals having a period equal to the period of variation of said second signal, said control signals having a characteristic such that said two channels have substantially equal gain when said gates are at said mean time spacing, said first channel has a greater gain than said second channel when said gates are at time spacings less than said mean time spacing and said second channel has a greater gain than said first channel when said gates are at time spacings greater than said mean time spacing, means applying said signal to be tracked to the input of said gated receiver, and means responsive to the difference in output of said first and second signal channels and coupled to said first signal generating means for controlling the amplitude of said first signal in a direction to cause said gates when at said mean time spacing to coincide in time with the time of occurrence of said signal being tracked.

8. Apparatus as in claim 7 wherein said means for generating a first signal comprises a voltage divider having input and output terminals and a control means movable to vary the voltage division of said divider, the input terminals of said divider being connected to the terminals of a source of direct current potential, and wherein said means for controlling the amplitude of said first signal comprises a motor actuated by the differential output of said two channels and coupled to said control means of said voltage divider, said motor being adapted to rotate in a direction dependent upon which of said channels has the greater output.

9. Automatic apparatus for tracking a received radio echo signal which varies in phase with respect to a series of transmitted timing pulses, comprising means for generating a first signal, means for generating a second signal varying sinusoidally with respect to time at a frequency substantially less than the recurrence frequency of said timing pulses, a first multivibrator responsive to said timing pulses, said first signal and said second signal for producing a first gate in response to each of said timing pulses, each of said first gates having a leading edge coincident in time with a corresponding timing pulse and a trailing edge spaced in time with respect to said corresponding timing pulse by an amount dependent substantially on the sum of the instantaneous amplitudes of said first and second signals at the instant of occurrence of said corresponding timing pulse, a second multivibrator responsive to said first gates for producing a second gate for each of said first gates, each of said second gates having a constant time duration, said time duration being substantially less than the time duration of a first gate, each of said second gates having a leading edge coinciding with the trailing edge of a first gate, a normally inoperative receiver, means for applying said radio echo signal to the input of said receiver, means applying said second gates to an input of said receiver to render said receiver operative for the duration of said second gates, first and second amplifying channels, means applying the output of said receiver to each of said amplifying channels, and means for applying third and fourth signals respectively to said first and second channels, said third and fourth signals varying sinusoidally with respect to time at the frequency of said second signal and being in fixed phase relationship with said second signal, said third and fourth signals being out of phase with each other by 180 degrees and having equal maximum amplitudes, said first channel being rendered operative by said third signal for a time interval preceding a reference time at which said third and fourth signals have zero amplitudes and rendered inoperative for a time interval following said reference time, said second channel being rendered inoperative for said time interval preceding said reference time and being rendered operative at said time interval following said reference time, said channels when operative passing said receiver output and means coupled to said first signal generating means and responsive to the differential output of said channels for controlling the amplitude of said first signal in a direction to cause the mean time of occurrence of said gates to follow the time of occurrence of said echo signal being tracked.

References Cited in the file of this patent

UNITED STATES PATENTS

| | | |
|---|---|---|
| 2,379,899 | Hansell | July 10, 1945 |

| | | |
|---|---|---|
| 2,402,916 | Shroeder | June 25, 1946 |
| 2,403,527 | Hershberger | July 9, 1946 |
| 2,406,316 | Blumlein | Aug. 27, 1946 |
| 2,419,239 | White | Apr. 22, 1947 |
| 2,467,208 | Hahn | Apr. 12, 1949 |
| 2,482,544 | Jacobsen | Sept. 20, 1949 |
| 2,493,774 | Moore | Jan. 10, 1950 |
| 2,538,027 | Mozley et al. | Jan. 16, 1951 |
| 2,628,349 | Nightenhelser | Feb. 10, 1953 |